United States Patent [19]

Wehner

[11] 4,064,051
[45] Dec. 20, 1977

[54] ELASTIC TRANSPORTING, SIEVING OR FILTERING BASE WITH SWINGING DRIVE

[75] Inventor: Albert Wehner, Willaringen, Germany

[73] Assignee: Hein, Lehmann Akt., Dusseldorf, Germany

[21] Appl. No.: 510,960

[22] Filed: Oct. 1, 1974

Related U.S. Application Data

[63] Continuation of Ser. No. 363,120, May 23, 1973, abandoned.

[30] Foreign Application Priority Data

June 2, 1972 Germany .............................. 2226968

[51] Int. Cl.² ......................... B01D 35/20; B07B 1/42
[52] U.S. Cl. .................................... 210/389; 209/310; 209/382
[58] Field of Search ...................... 209/310, 396, 382; 210/384, 385, 388, 389

[56] References Cited

U.S. PATENT DOCUMENTS

| | | | |
|---|---|---|---|
| 1,958,322 | 5/1934 | Symington | 209/310 X |
| 2,167,236 | 7/1939 | Gieseler | 210/388 X |
| 2,648,441 | 8/1953 | Soldan | 210/389 |
| 2,735,550 | 2/1956 | Fagerberg | 210/384 X |
| 3,208,594 | 9/1965 | Wehner | 209/396 X |
| 3,252,573 | 5/1966 | Assinck et al. | 210/385 X |
| 3,633,745 | 1/1972 | Wehner | 209/310 |
| 3,647,068 | 3/1972 | Wehner | 209/310 |

Primary Examiner—Wilbur L. Bascomb, Jr.
Assistant Examiner—Robert H. Spitzer
Attorney, Agent, or Firm—Allison C. Collard

[57] ABSTRACT

A transporting, sieving or filtering base or bottom consists preferably of extensible or bendably elastic materials and is divided into zones and supported. The individual zones are fixed between transverse elements or carriers which either belong to a driving frame system or constitute transverse braces of a frame or other supporting elements. The invention is particularly characterized in that the carriers or transverse braces limiting the zones have supporting or moving elements which make them movable individually upon a corresponding sliding roller and an elastically movable guiding path or in an elastically movable guiding profile. The movement is so carried out that the carriers or braces are shiftably coupled with each other while moving in the same direction in or upon these elements when the cross-sections connecting them reach their greatest possible longitudinal extension. Due to this the parts of the transporting, sieving or elastic bases located between the transverse braces or carriers or sections located close to the transverse braces which transmit to them a concave or convex initial location or a pretensioned horizontal initial location, are placed into a continuously moving preferably linearly extending possibly overextended position.

16 Claims, 17 Drawing Figures

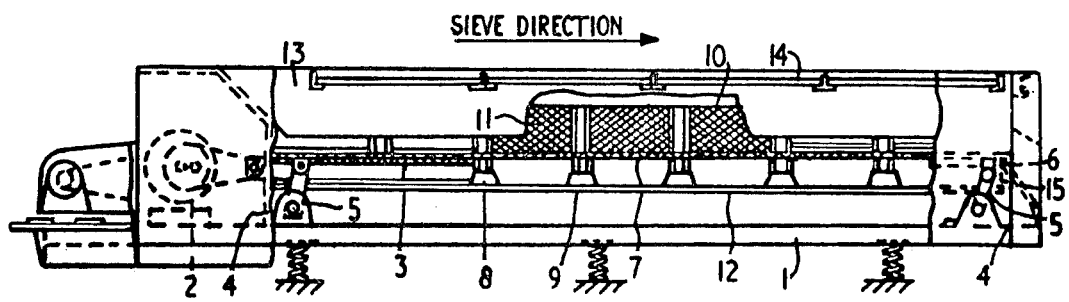
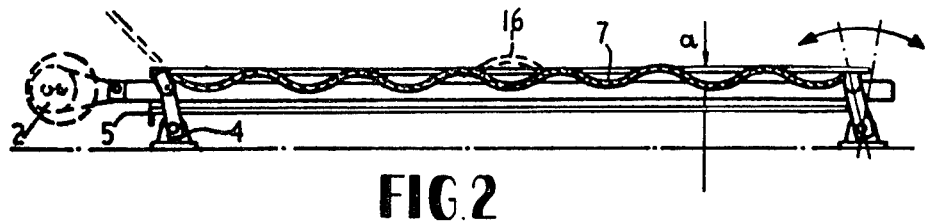
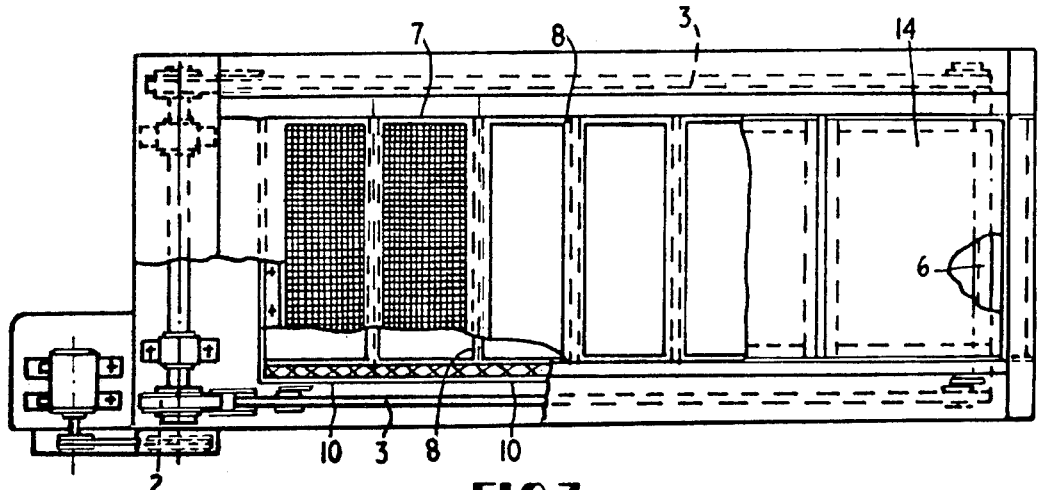
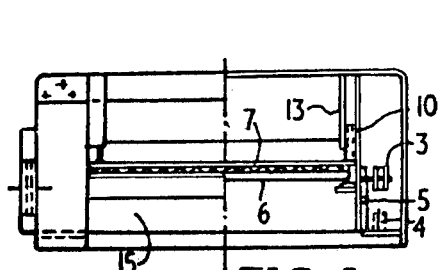
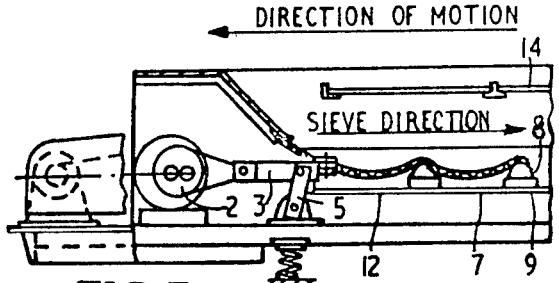

ELASTIC TRANSPORTING, SIEVING OR FILTERING BASE WITH SWINGING DRIVE

This is a continuation of application Ser. No. 363,120, filed May 23, 1973, now abandoned.

This invention relates to a transporting, sieving or filtering base preferably consisting of elastic or shape-changing materials or combinations of materials which for its movement and function is provided with a drive causing it to carry out swinging movements. These movements produce the loosening and transportation of the supplied goods. However, they also move the base in such manner that it can free itself from attached fine particles or from corns clamped in its openings, so that actually the base by itself holds itself free from clogging.

Sieving bottoms are known which are used with machines and the transverse carriers of which are provided with two frame systems movable relatively to each other, so that the elastic transverse elements connected to the transverse carriers form sieving zones of continuously varying width, variable hanging of different depth, bent curvature or different tension. The sieving zones can extend transversely to the sieving direction or in the sieving direction. In known machines the movement of the transverse carriers causing the movement of the sieving zones takes place either upon circular swinging tracks, whereby the two systems swing relatively to each other with a shifting of 180° or upon machines wherein the transverse carriers operate with shifted tipping movements or with a linear swinging direction.

An object of the present invention is to provide a completely new driving and moving principle for an elastic or form changing transporting, sieving or filtering surface, which with zone-shaped arrangements has sections of continuously changing width which, however, as compared to existing ones, have a completely different structure and function.

The advantages of this new principle consist in a considerably lesser machine requirement and thus in a less expensive production, as well as in very small accelerated masses which have a good effect on operational costs and wear.

The construction of the transporting sieving or filtering base of the present invention can be compared with a surface provided with folds which along its entire length is alternately stretched and again folded. This movement similar to that of a harmonica produces effects which could not be attained in known much more expensive devices as far as the function of a sieving device is concerned.

According to the present invention each transporting, sieving or filter zone forms actually one fold which can be concave or convex. Each zone is closed by a transverse bar upon which the hanging transporting, sieving or filtering base is fixed.

Obviously, the zone sections can be also hung upon these transverse bars.

In accordance with the present invention the transverse bars can be so constructed at their ends that they will be capable of a linear movement which can extend horizontally or at an inclination and which causes a tightening of each individual zone or of its concave or convex position during discharging, i.e. when the transverse bars approach each other.

This possibility of movement can be provided, for example, when the ends of the transverse bars carry slides or rollers mounted upon a corresponding guiding path in the side walls of the entire device.

A particularly simple solution is provided when the transverse bars are mounted in an elastic edge profile which can be stretched and then released.

This construction also provides a return resilient movement into an untensioned or less tensioned position, such as the convex or concave position of the individual sieve zones.

When slides or rollers are provided at the transverse bars in certain conditions it is necessary to provide an additional cross-section limiting the extension of the elastic sieve zones, for example, a spring steel bond or a flat line, as well as an arrangement of return springs which provide the changing into the concave or convex zone of the individual sieve zones.

In accordance with the construction of the present invention which operates with more or less great tension of the individual sieve zones, so that there is no relative convex or concave position in the narrowest position of the transverse rods to each other, the rear spring action of the transporting, sieving or filtering base can be used by itself. This solution is used particularly often when the base of the present invention is a transporting base.

In that case the present invention provides that for the forward movement and the return movement two different speeds are provided, namely, for the forward movement, i.e. the greatest extension of the transporting band, preferably a lesser speed is selected than for the return movement. This operation can be attained, for example, by a gear drive with corresponding curves or also in that the forward movement takes place by a machine, while the return movement after a release takes place by a release of the tensioning energy within the elastic transporting band.

As already stated, in general the movement of the transverse bands takes place in a linear movement parallel to the frame of the device provided with guiding paths.

However, it is also possible to move the individual transverse rods upwardly in an inclined direction in upwardly inclined sections, similar to a toothed fixture.

The transverse rods are preferably so constructed that they have receiving and fixing means upon which can be mounted and fixed a stick bar as a connecting member to the actual transporting, sieving or filtering bases. This stick bar remains a part of the actual mounted transporting, sieving or filtering base. Due to this arrangement the actual swinging drive consisting of the guide frame with the side actuating bands and the transverse rods mounted thereon, can remain complete with the means receiving the connecting bars of the transporting, sieving and filtering base, whereby for full completion the actual driving member, such as a pneumatic or hydraulic cylinder, a curve drive or an excenter drive, an electromechanical mechanism, etc. can be built in the entire guiding frames.

Instead of the specially constructed longitudinal profile and longitudinal guides it is possible to use a rough preferably elastic sieving base for driving the actual dividing sieving bottoms, the base consisting of a stretchable material or being combined with stretchable materials.

Obviously it is also possible to use a bendably elastic substance or a bendably elastic tissue, for example, of resilient steel, or a perforated sheet of hard plastic material. It is also possible to use combinations with rigid central portions and elastic edge parts. Preferably the sieve base parts are provided at the sides with elastic side walls for the guiding of the goods being sieved, the walls having shapes for longitudinal adjustment, for example, a structure with folds. These elastic side walls are preferably connected at the same time with longitudinal profiles which produce the drive of the sieving base.

Furthermore, in accordance with the present invention it is possible to arrange the transporting, sieving or filtering bottoms in several stages one above the other and to provide corresponding side connections.

It is also possible to provide over the transporting, sieving or filtering bottom an elastic slidably closing cover which prevents dust and keeps springing particles in the transporting, sieving or filtering process.

This arrangement makes it possible to remove rough pieces of adhering grain by its striking the closing cover and by the counter movement of the cover.

The overflow side of the sieve base but also its receiving side can be connected to a movable transverse member along with the longitudinal profiles, which, as already stated, can be driven by an excenter drive or a crank drive directly or through a connecting rod supported by a slide or a swinging support. The type of the drive has no limits, thus for example, two driving transverse members can carry out the movement, one being located on the overflow side, while the other is located on the receiving side.

When the sieving zones extend in the sieving direction the drive can be also carried from two closing side edges.

The drive can be a toggle lever drive, a hydraulic, pneumatic electric or lever mechanical drive. The individual zones can be also operated by their own drives through toggle levers.

These individual drives are then separately steered. The use of the transporting, sieving or filtering base or bottom of the present invention covers substantially all transporting, sieving or filtering requirements. Goods which are clayey or wet can be sieved, transported or filtered with it. It can be arranged in open, partly open or closed containers depending upon the task and the drive can be selected accordingly, whereby the actual sieving or filtering surface can have a horizontally inclined or vertical position.

The invention will appear more clearly from the following detailed description when taken in connection with the accompanying drawings showing by way of example only, preferred embodiments of the inventive idea.

In the drawings:

FIG. 1 is a side view partly in section of a transporting, sieving and filtering base of the present invention.

FIG. 2 is a diagrammatic side view showing the device of FIG. 1 in a discharged position.

FIG. 3 is a top view of the device of FIG. 1.

FIG. 4 is a side view, partly in section, showing the driving side.

FIG. 5 is a section of the driving side showing a somewhat different construction.

Figure 6:
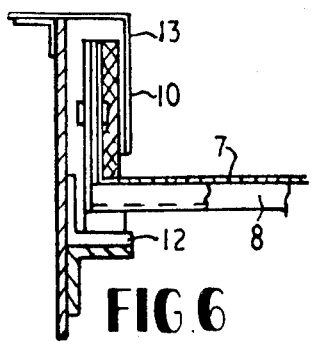
FIG. 6 is a partial section showing the side support of the transverse brace.

FIG. 1 shows in side view one embodiment of a transporting, sieving and filtering bottom having a base frame 1 with a crank drive 2 located upon the receiving side. The drive 2 drives connecting rods 3 at both sides of the actual transporting, sieving or filtering surface.

The rods 3 are swingably connected with bearings 4 and 4' and swinging levers 5 and 5'. Ends of the two rods are connected on the front side by a transverse rod 6 which has the task of tensioning or releasing the tension of the elastic transporting, sieving or filtering surface 7.

The transporting, sieving or filtering surface consists of the actual closed or perforated separating surface 7, transverse rods 8 with sliding or rolling bearings 9 as well as elastic side limiting members 10 which are connected sectionwise to supports 11 connected to transverse rods 8.

When sliding bearings or slides are used for the transverse rods 8, they are provided with specially suited slide substances of plastics or smooth metal.

A corresponding sliding path 12 provides good guiding possibilities. Elastic side limiting members 10 are covered by conducting metal sheets 13, possibly also to provide a seal. The frames 14 serve to move back the springing gain depending upon their set intensity. The overflow slide 15 can be connected with a swinging transverse member 16. It is also possible to provide an elastic apron.

FIG. 2 differs from FIG. 1 in that it shows the transporting, sieving or filtering base 7 in a discharged position, namely, the transporting, sieving or filtering zones have a concave position with the maximum hanging down indicated by a.

By changing from a hanging down position (or also convex position indicated by the numeral 16) into the tensioned position shown in FIG. 1, very intensive movements of the goods subject to transportation, sieving or filtering take place, even in case of most difficult goods, whereby a possible over-extension of the individual zones provides freedom from clogging and sticking.

The extent of movement of the tensioning or swinging transverse bars 6 amounts to the number of the zones multiplied by the difference in length of each individual zone between its tensioned and untensioned positions.

In actual practice there can be a difference of, for example, 15 mm between the tensioned and the untensioned positions in the individual zones. Then in case of illustrated seven zones the path of movement of the swinging transverse bar 6 will amount to 7 × 15 = 105 mm. This corresponds to an excentricity for the illustrated crank drive of 52.5 mm. In that case if a stroke cylinder is used as a driving member, the required stroke will amount to 105 mm.

FIG. 4 shows a side view with a detail of the driving side and illustrates in section the swinging lever bearing 4, the swinging lever 5, the connecting rod 3, the conducting sheet 13 and the elastic side limiting member 10 as well as the swinging transverse bar 6. These parts are used to drive the transporting, sieving or filtering base.

FIG. 5 shows somewhat clearer the conditions at the driving side. However, the construction of FIG. 5 differs from that of FIG. 1 in that according to FIG. 5 the drive for the transporting, sieving or filtering base at the receiving side takes place with a short connecting rod 3. The movement interval which takes place after the stretching of the zones one after the other, is carried out in a reverse manner to that of FIG. 1 with the pulling drive located forwardly at the overflow side, namely in that the tensioning of the zones and thus the transportation of the transported, sieved or filtered goods always starts from the overflow side, while according to the construction of FIG. 5 the drop and transportation start at the receiving side.

FIG. 6 shows in section the side support of the transverse bars 8 which in this case are provided with side shoes guided upon a sliding path 12. Also shown are side sieve base connections with the conducting sheet 13 extending over the elastic side limiting member 10.

Figure 7:
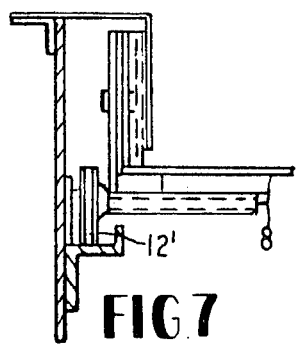
FIG. 7 is a similar section showing a different support.

FIG. 7 shows the support of the zone carriers 8 by roller bearings 12.

These roller bearings can be replaced by linearly extending roller bearing means.

Figure 8:
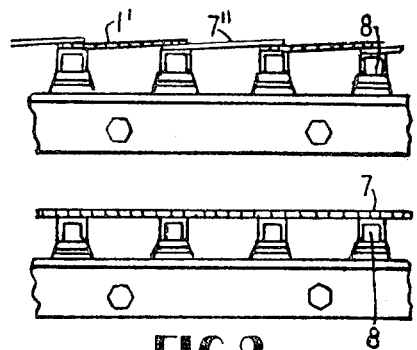
FIG. 8 is a diagrammatic partial side view showing a possible arrangement of the actual sieve surface.

FIG. 8 shows, by way of example, an arrangement of the actual sieving surface, which can have an extending sieving plane 7, or zone sections 7' and 7" extending over each other.

Figure 9:
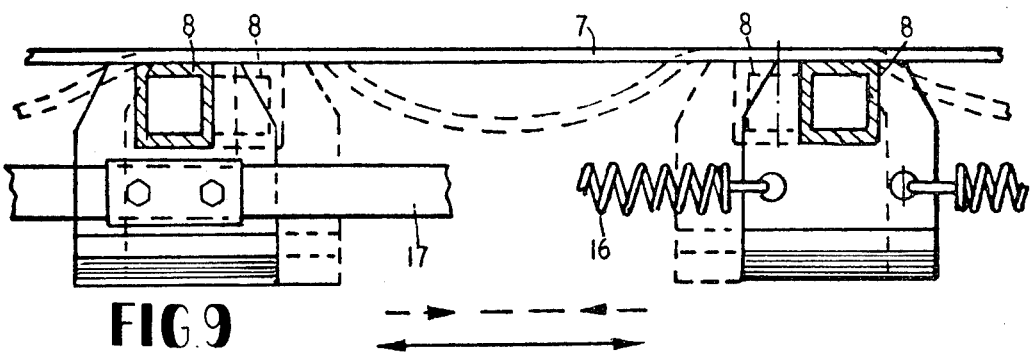
FIG. 9 is a diagrammatic side view of a zone section.

FIG. 9 shows an enlarged zone section and illustrates in a simplified manner how the location of the transporting, sieving or filtering surface is changed depending upon the position of the transverse bar 8 from a concave position to a stretched position. In this construction it is possible to provide an absolute safety of operation and an undisturbed rhythm between tensioned and untensioned positions by providing additional zone springs 16 or also an elastic pulling band 17 for the safe return of the transverse bars for the concave or convex position of the transporting, sieving or filtering surface. Furthermore, the present invention suggests that in special cases, wherein a specific overstretching of the transmitting or sieving surface should take place, firm against pulling but bendably elastic cross-sections should be provided in conjunction with sliding shoes of the transverse bars, the length of which is such that they limit the desired extension in the tensioning location of the zones to the actual transporting, sieving or filtering covering. Thus they actually determine the entire length of the transporting, sieving or filtering surface in tensioned condition.

Figure 10:
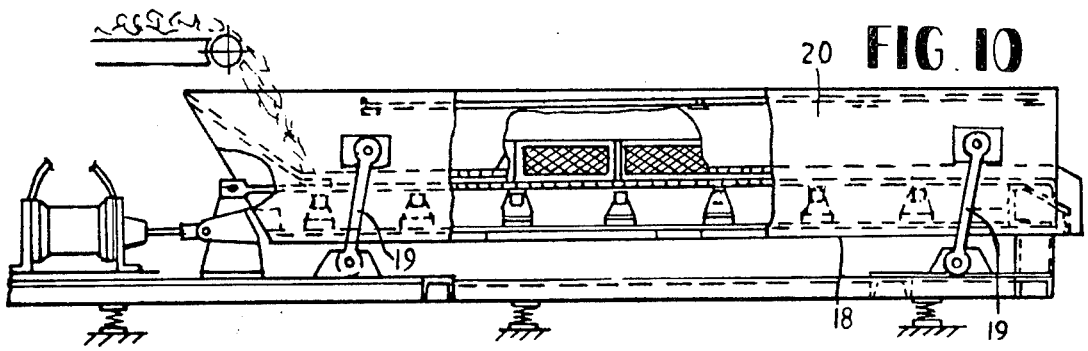
FIGS. 10 to 17 are all side views partly in section, showing different embodiments of the present invention.

FIG. 10 illustrates a construction which is particularly interesting from a driving technical standpoint wherein a transporting, sieving or filtering vat 20 which is movable over a fixed guiding path 18 over guides 19, is used to provide a movement according to the present invention for transportation, sieving or filtering.

The drive of the vat takes place in a simple manner by a pressure cylinder 21 which is double active.

Figure 11:
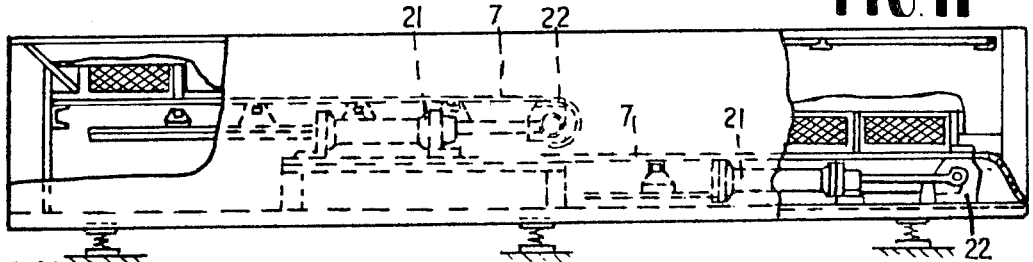

FIG. 11 illustrates a construction wherein two sliding transverse members 22 are located within the vat. They are actuated by cylinders 21 and produce according to the present invention a transporting, sieving or filtering action in two transporting, sieving or filtering surfaces 7 connected one behind the other.

Figure 12:
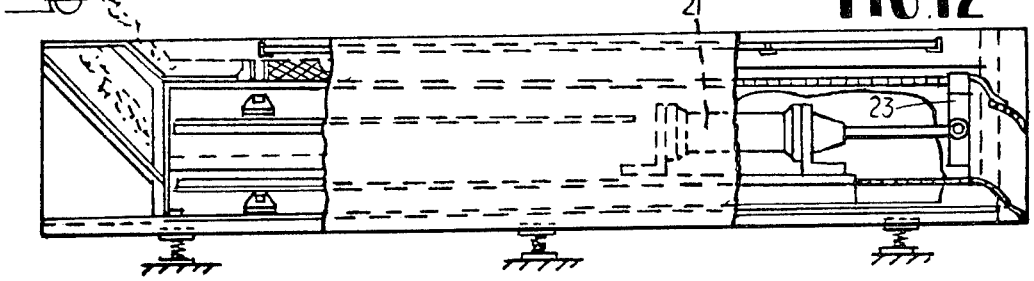

FIG. 12 illustrates an embodiment of the present invention wherein two transporting, sieving or filtering surfaces located one over the other are operated in a vat by a double transverse member 23 and a double acting driving cylinder 21.

It is then possible to carry out numerous classifications or to use the transporting, sieving or filtering surfaces individually.

Figure 13:
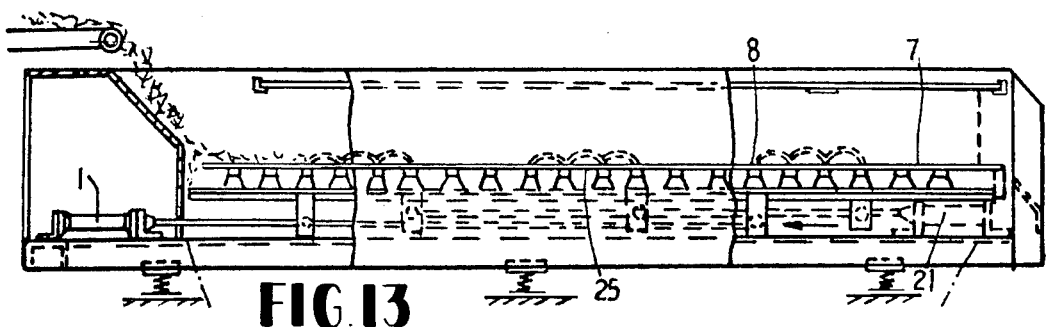

FIG. 13 shows in principle how the present invention can be incorporated in a guide-like transverse arrangement by two pressure cylinders which preferably operate in opposite directions.

Elastic pulling or carrying bands or mats are stretched between transverse bars 8 and have convex folds forming transporting, sieving or filtering surface sections 7 caused to carry out characteristic movements according to the principle of the present invention, whereby completely linear driving movements also produce a vertical movement of the transported, sieved or filtered goods.

Figure 14:
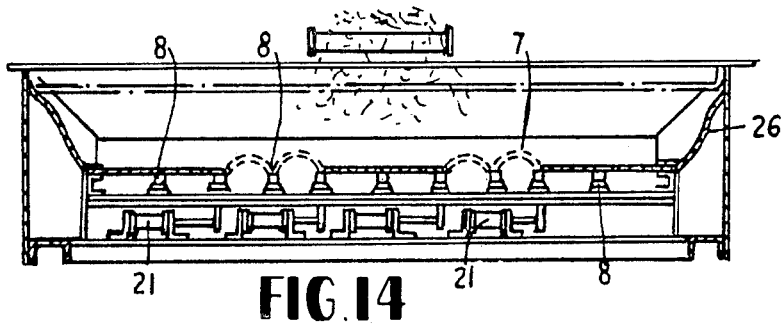

FIG. 14 shows individual transverse rods 8 operated by stroke cylinders, electromagnets or the like 21 which can or need not be steered and which preferably operate in a precise time period the convex or concave elastically located surface 7. At the same time there is shown the possibility of driving the transverse bars also longitudinally in the transporting, sieving or filtering direction; simple elastic covers 26 provide a very simple side limitation or sealing.

Figure 15:
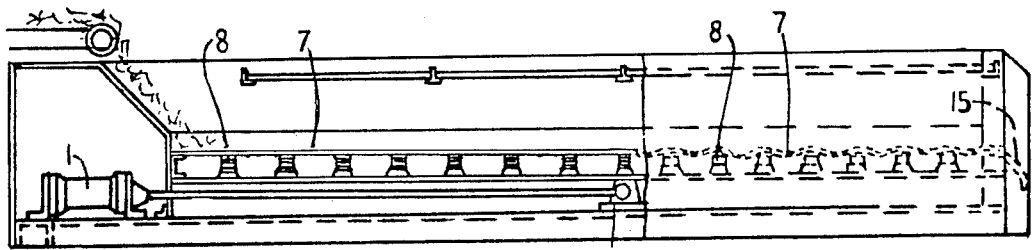
Figure 16:
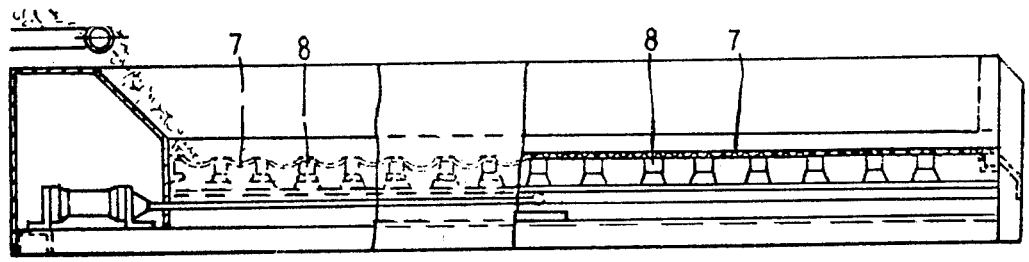

FIGS. 15 and 16 show a construction of the present invention wherein by means of a double operating stroke cylinder 21 and a driving transverse bar 22 lying in the middle of a sieve vat, it is possible to operate a doubly large transporting, sieving or filtering surface, whereby the halves of the sieve surface are alternately tensioned and untensioned. FIG. 15 shows the right half of the surface as being untensioned while the left side is tensioned. FIG. 16 shows the reverse positions.

This construction of the present invention has the advantage that the start of the transporting, sieving or filtering surface at the receiving side as well as the end of the transporting, sieving or filtering surface at the overflow side are located at rest in the vat.

Figure 17:
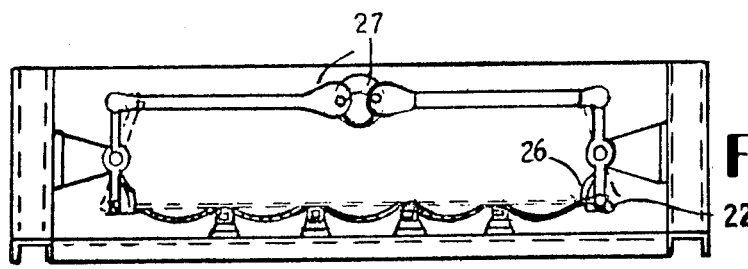

FIG. 17 shows a construction similar to that of FIG. 14 wherein the drive of a transporting, sieving or filtering surface operating transversely to the direction of transport takes place by a double crank or a double excenter 27 with corresponding levers and transverse pieces 22'.

I claim:

1. In combination, a screening base, transverse carriers connected with said base and dividing it into a plurality of zones, and driving devices connected with said carriers for making them singly movable and coupling them one after the other in the same linear and continuing movement to change the zones from their initial concave or convex position to a tensioned horizontal position, and from the horizontal position to a concave or convex position.

2. A screening base according to claim 1, said base consisting of a stretchable material, and a second base located underneath the first-mentioned base, said devices constituting transportation means attached along transverse carriers and between the carriers, the continuing movement of the first-mentioned base consisting of its movement from a concave or convex folded position to a tensioned plane position.

3. A screening base according to claim 2, wherein the first-mentioned base extends over the entire screening area and has several sections, each section covering a plurality of zones.

4. A screening base according to claim 3, having a plurality of bases located behind each other and connected with each other in a plane, and a transverse member connected with said devices and said bases and causing said bases to carry out a common movement at the feeding end or the overflow end, said transverse carriers acting as driving transverse members.

5. A base according to claim 3, wherein the lengths of the individual zones are such that they are still subject to tension when the transverse carriers are closest to each other, the driving devices causing an increased tensioning of the zones in the horizontal direction, the first-mentioned base being moved with lesser speed during its forward movement than during its reverse movement.

6. A screening base according to claim 3, comprising a plurality of bases located one above the other with a separate guiding path for each base, an elastic cover above the uppermost base and a closed bottom below the lowermost base, said devices constituting a mutual drive for the bases, said cover and said bottom.

7. A screening base according to claim 3, wherein said devices comprise a driving transverse member located between the two bases, each base consisting of several zones, the last-mentioned transverse member alternately tensioning and untensioning the base sections while the end sides at the feeding and overflow sides stand still.

8. A screening base according to claim 2, comprising means steering the transverse carriers along inclined lateral guiding paths.

9. A screening or filtering base according to claim 2, wherein said transverse carriers extend in the direction of the transportation, screening or filtering device and comprise driving means extending transversely to this direction and causing alternating cresting and tensioning of the first-mentioned base transversely to this direction.

10. A screening base according to claim 2, comprising elastic side borders for guiding the transportation of the screening or filtering material and having an equalizing effect on the horizontal and vertical movements of the first-mentioned base, and settings carried by the edges of the zones to strengthen the edges and separate the zones.

11. A screening base according to claim 2, wherein said second base is located within at least a part of each zone and at crested parts of the first-mentioned base.

12. A screening base according to claim 1, which is also a transporting base.

13. A screening base according to claim 1, which is also a filtering base.

14. A screening base according to claim 1, wherein the last-mentioned drive comprises a connecting rod connected to the last-mentioned transverse member and a support engaging said connecting rod, said drive being selected from a drive consisting of an excenter drive and a crank drive.

15. A screening base according to claim 1 comprising a shearing mechanism, the drives of the individual transverse members being connected to said mechanism, and a general drive actuating said mechanism.

16. A screening base according to claim 1 having a stationary casing, some of the transverse members with driving bands and stationary members connected therewith being located within said casing, other transverse members being connected directly to the base and being remarkably connected with said stationary members.

* * * * *